Sept. 20, 1955 P. F. ERBGUTH 2,718,239
SAFETY ARRANGEMENT FOR PRESSURE VESSELS
Filed July 8, 1952 5 Sheets-Sheet 1
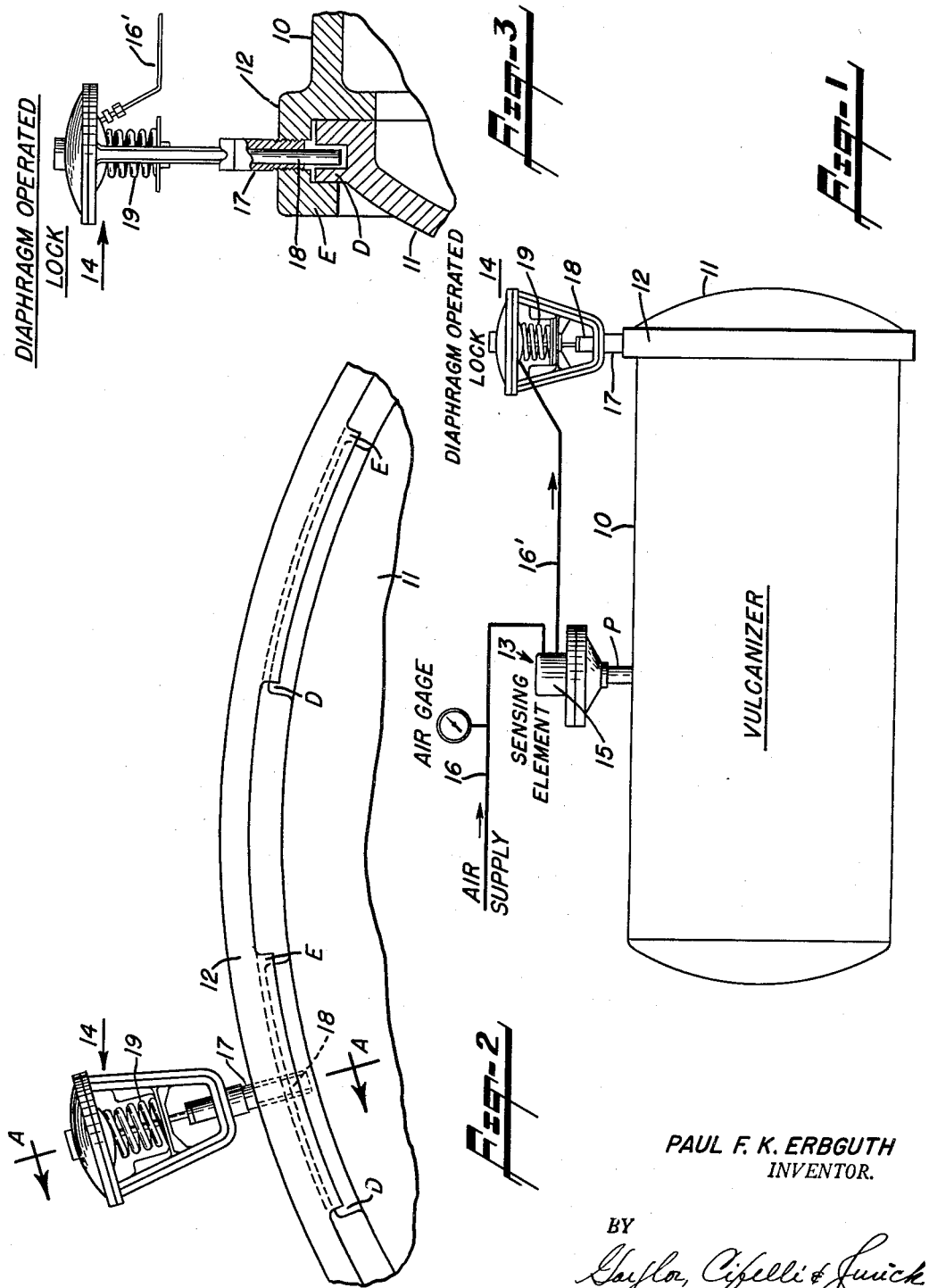
PAUL F. K. ERBGUTH
INVENTOR.

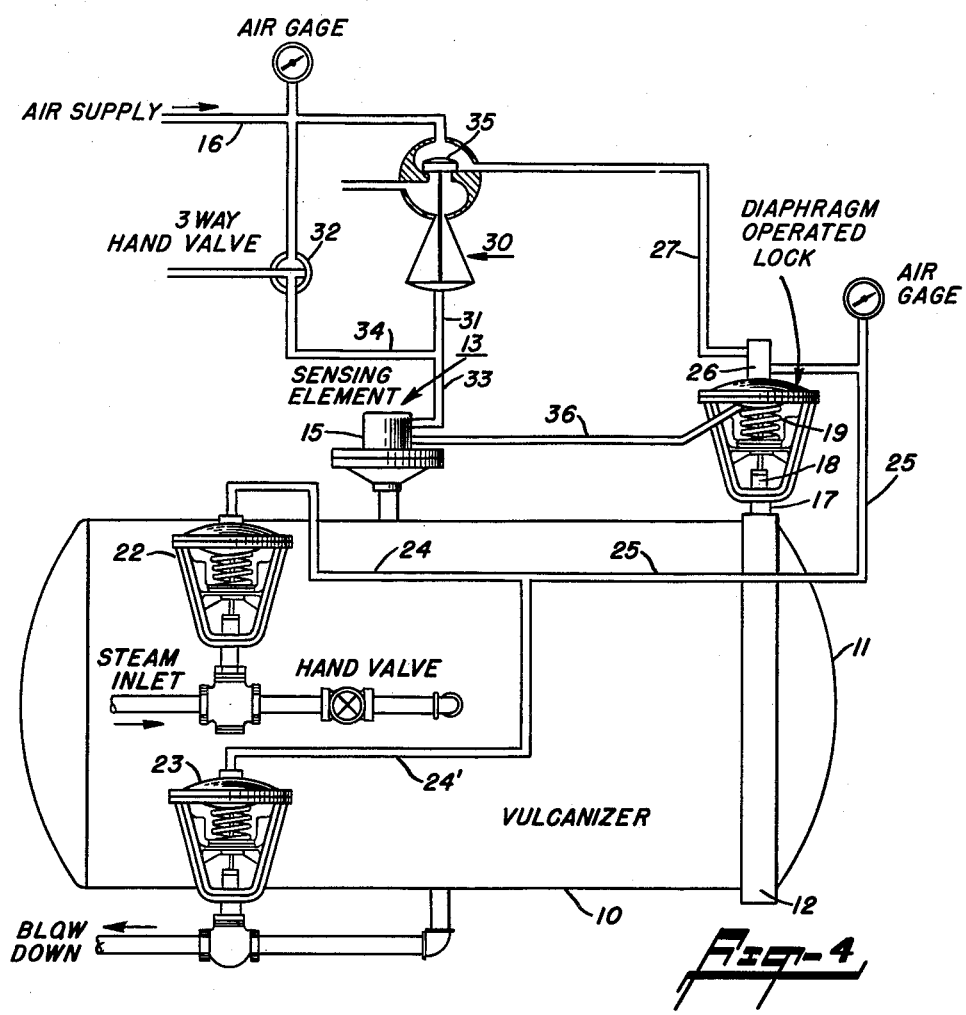
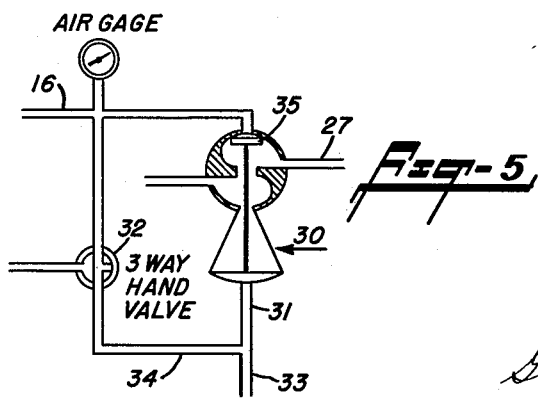

Sept. 20, 1955 P. F. ERBGUTH 2,718,239
SAFETY ARRANGEMENT FOR PRESSURE VESSELS
Filed July 8, 1952 5 Sheets-Sheet 3
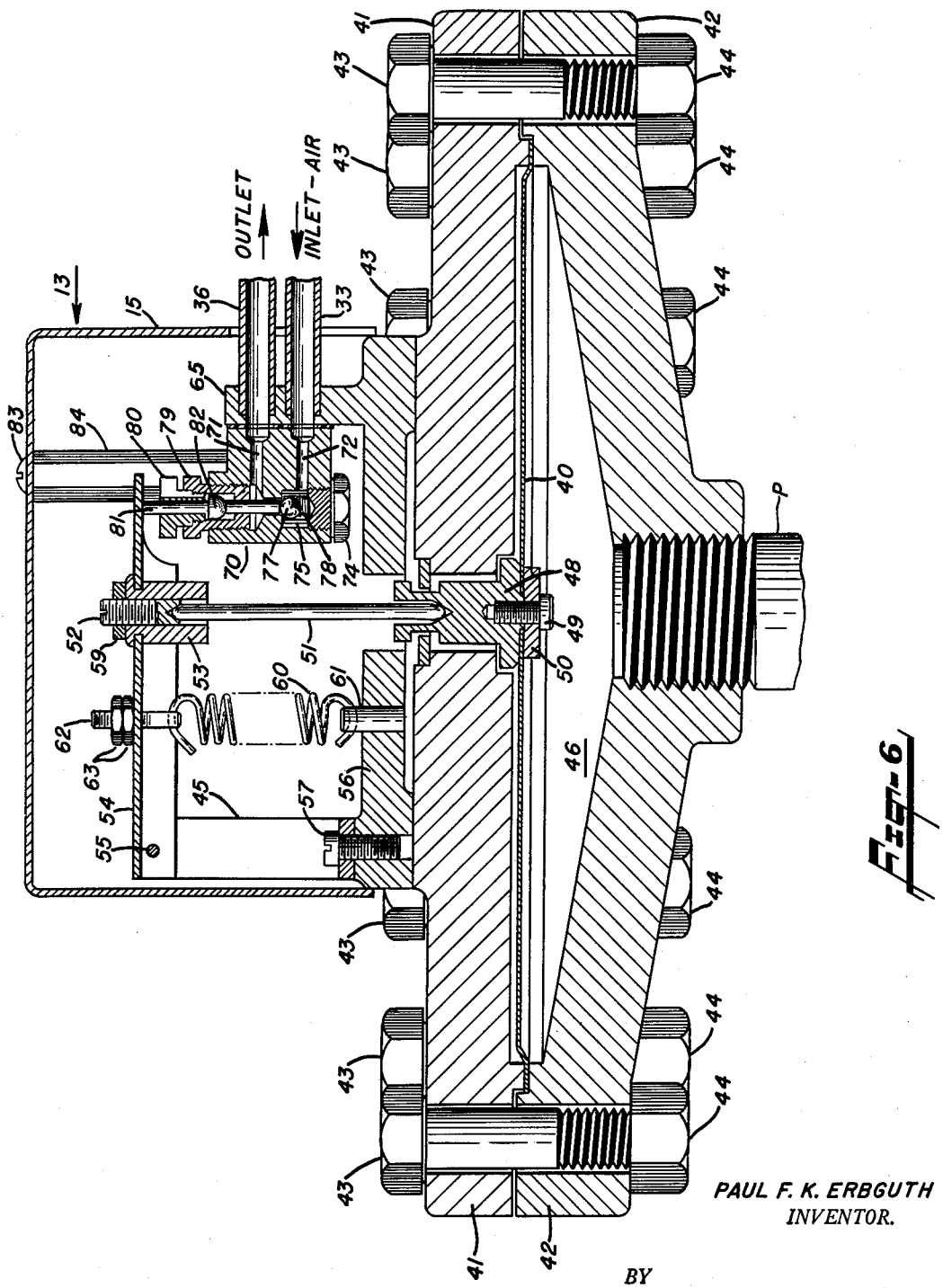
PAUL F. K. ERBGUTH
INVENTOR.
BY
Gayla, Cifelli & Junick
ATTORNEYS

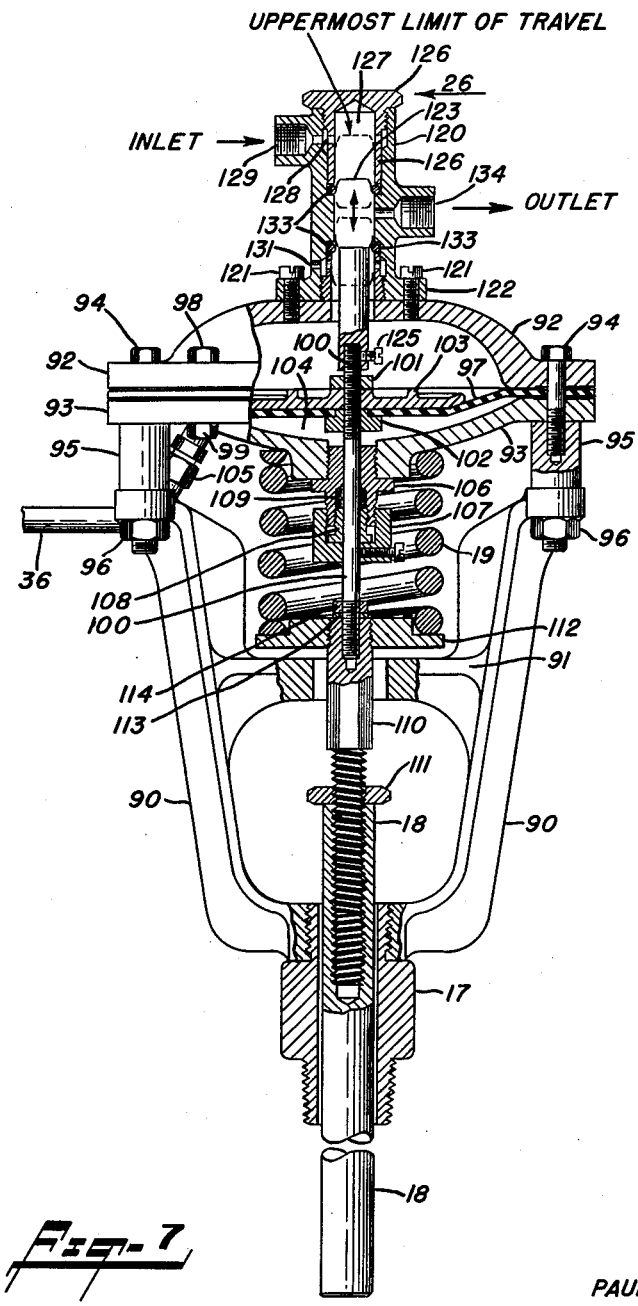

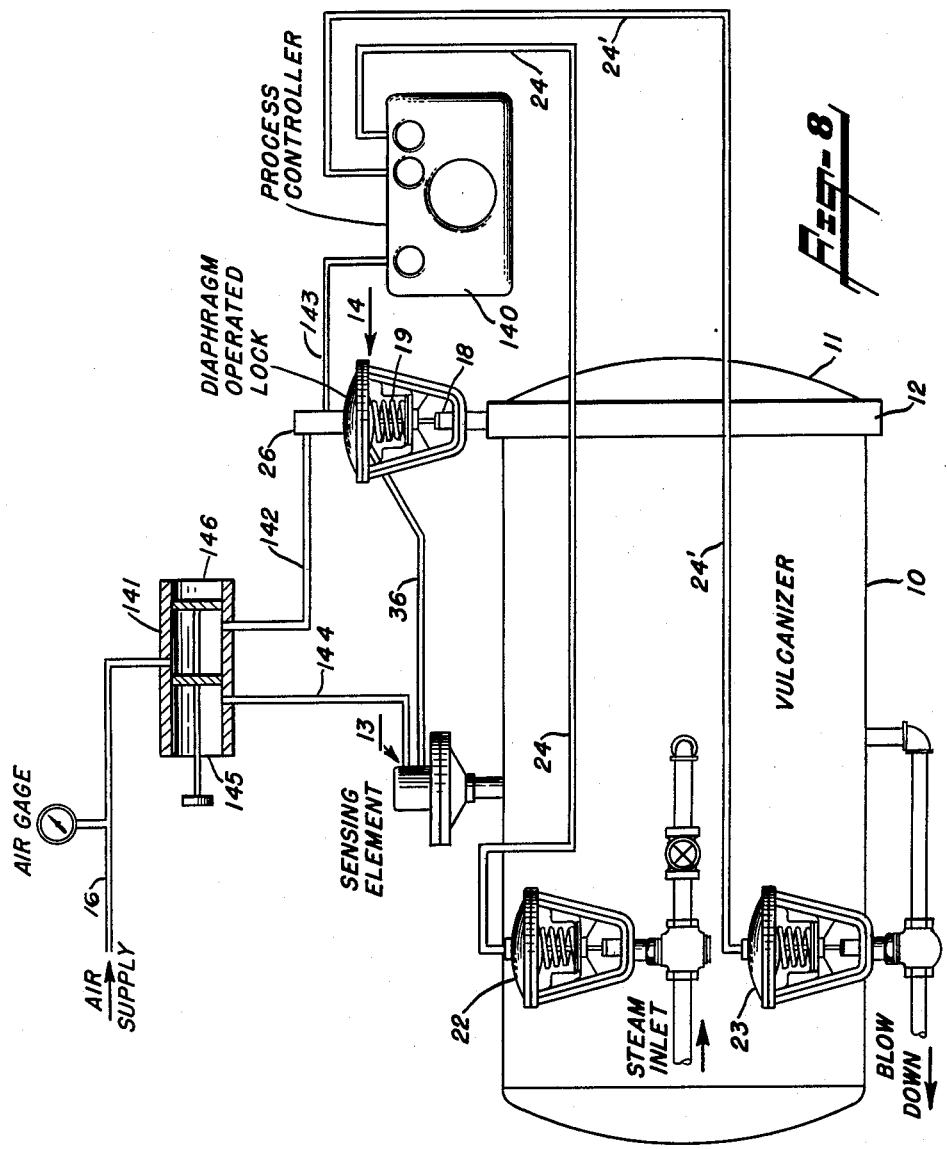

United States Patent Office 2,718,239
Patented Sept. 20, 1955

2,718,239
SAFETY ARRANGEMENT FOR PRESSURE VESSELS

Paul F. K. Erbguth, Great Neck, N. Y., assignor to Weston Electrical Instrument Corporation, Newark, N. J., a corporation of New Jersey Application July 8, 1952, Serial No. 297,704

9 Claims. (Cl. 137—586)

This invention relates to door closure-securing means and more particularly to a safety arrangement adapted to prevent the pressurizing of a vessel unless the door thereof is properly and completely locked in position and to prevent opening of the door until the pressure within the vessel is reduced to a safe limit.

Cylindrical vessels, of the class to which the present invention particularly is directed, are of large size and include a relatively large door through which human beings and industrial trucks may pass during the process of loading and unloading the vessel. Since the force tending to open the circular door of a cylindrical pressure chamber varies as the square of the door diameter, the means for retaining a relatively large door in closed position must be capable of withstanding forces of large magnitude. In the case of vessels subjected to steam pressure, the door closure and securing means are of special importance since any structural failure may result in serious human injury or loss of life. The possibility of such structural failure is, of course, reduced to a minimum by employing suitable safety factors in the design of the parts. However, many accidents occur by reason of human failures. For example, if the mechanical door-locking means are unfastened before the pressure within the vessel has been reduced to a safe limit, the door may be blown open. So too if the door is not completely and properly closed prior to the opening of the steam valve for pressurizing the vessel. These dangerous conditions are encountered particularly in the case of pressure vessels having breech-lock doors. Additionally, the accidental opening of the steam inlet valve at a time when the vessel is being loaded or unloaded has resulted in numerous cases of steam scalding.

An object of this invention is the provision of a safety arrangement whereby the door of a vessel cannot be opened unless the pressure within the vessel has been reduced to a safe value and whereby the vessel cannot be pressurized unless the door is properly and completely closed.

An object of this invention is the provision of a door-securing means for a vessel and including a locking pin adapted to lock the door in closed position, a diaphragm-operated member controlling the position of the locking pin, and a sensing element responsive to the pressure within the vessel and effective to control the operation of the diaphragm-operated member whereby the locking pin is retained in the door-locking position when the pressure within the vessel exceeds a predetermined minimum magnitude.

An object of this invention is the provision of a safety arrangement for a pressure vessel having a door said arrangement comprising an air-operated locking pin associated with the door and movable from door-locking to door-unlocking position by a diaphragm member, a sensing element responsive to the pressure within the vessel, an air valve operated by the sensing element to control actuation of the diaphragm member, a control valve operating between a closed and an open position depending on the position of the locking pin, a steam inlet valve for the vessel said valve being closed when the said control valve is closed, and an outlet valve for the vessel said outlet valve being open when the said control valve is closed.

An object of this invention is the provision of a pressure-actuated sensing element for a pressure vessel and including an air valve that moves from open to closed position in response to the pressure within the vessel.

An object of this invention is the provision of a diaphragm-operated locking arrangement for the door of a pressure vessel said arrangement including a slide valve controlling the operation of a valve in the steam inlet line of the vessel in accordance with the position of a door-locking pin.

These and other objects and advantages will become apparent from the following description when taken with the accompanying drawings illustrating several embodiments of the invention. It will be understood the drawings are for purposes of illustration and are not to be construed as defining the scope or limits of the invention, reference being had for the latter purpose to the appended claims.

In the drawings wherein like reference characters denote like parts in the several views:

Figure 1 is a diagrammatic representation of one simple embodiment of the invention;

Figure 2 is a fragmentary front view of the vessel shown in Figure 1 and drawn to an enlarged scale;

Figure 3 is a sectional view taken along the line A—A of Figure 2;

Figure 4 is a diagrammatic representation showing my safety arrangement applied to a pressure vessel having steam inlet and blow down valves;

Figure 5 is a fragmentary representation taken from Figure 4 and showing the three way hand valve and the diaphragm-controlled valve set in proper positions for depressurizing the vessel;

Figure 6 is a central, vertical sectional view of the sensing element and associated control valve;

Figure 7 is a central vertical sectional view of the diaphragm-operated lock and associated slide valve; and Figure 8 is a diagrammatic representation similar to Figure 4 but showing a fully automatic vessel control and safety-lock arrangement.

Reference is now made to Figures 1 to 3, wherein there is shown a large pressure vessel 10, here identified as a vulcanizer, having a circular door 11 at one end. The door is of breech-lock type having a plurality of peripherally-spaced dogs D corresponding to the radially-directed ears E formed in the frame 12 of the vessel. Those skilled in this art will understand that the door is secured to the vessel by properly alining the door dogs relative to the frame ears and rotating the door so that the dogs underlie the ears, as shown in Figures 2 and 3. Such heavy door and the associated securing means are designed to safely withstand the pressures developed within the vessel and when the internal pressure is reduced substantially to that of the atmosphere the door may be opened conveniently and with complete safety as regards the operator. However, as stated above, if the door is rotated toward the open position before the internal pressure has been reduced to a safe limit the door may be blown open. Also, if the door is not completely and properly locked into position such blowing out of the door may take place as the pressure within the vessel increases. To prevent either contingency I provide a pressure-responsive sensing element 13, that is secured to the vessel by a pipe P, and a diaphragm-operated lock 14. The sensing element, which will be described in detail hereinbelow, includes an air valve disposed within the upper housing 15 which valve closes off the air line 16, 16' when the pressure within the vessel exceeds a predetermined minimum magnitude, say greater than 10 inches of water. The diaphragm-operated lock 14, which will also be described in detail hereinbelow, is secured to the vessel frame 12 by a suitable pipe 17 and includes a heavy, steel pin 18 that is normally biased downwardly by a coiled spring 19. This pin passes through the supporting pipe 17, through a radial hole in the vessel frame 12 and into a radial bore formed in one of the dogs of the door 11. It may here be pointed out that the radial bore in the door is made to fit the locking pin 18 with a minimum of clearance so that the coiled spring will force the pin into the bore only when the door is completely and properly closed. As shown, the diaphragm operated lock 14 is connected to the air line through the valve disposed on top of the sensing element 13. Thus, if it be assumed that the door 11 is properly closed and the pressure within the vessel exceeds 10 inches of water, the air valve associated with the sensing element closes the air supply to the diaphragm-operated lock whereby the locking pin remains in the door-locking position thereby preventing the opening of the door. When the pressure within the vessel drops below 10 inches of water the sensing element valve opens and the air pressure is effective to overcome the bias of the coiled spring 19 of the diaphragm-operated lock thereby withdrawing the locking pin 18 from the bore in the door and permitting opening of the door.

Reference is now made to Figure 4 which is a diagrammatic representation showing my complete safety arrangement as applied to a large vessel having automatic, diaphragm-operated steam inlet and blow down valves. The steam inlet valve 22 is of the reverse-acting type, that is, the valve closes the steam inlet line when there is no air pressure in the line 24, and the blow down valve 23 is of the direct acting type, that is, the blow down line is open when there is no air pressure in the air line 24'. A hand valve 21 is included in the steam inlet line for operating convenience. It will be apparent, therefore, that unless a positive air pressure exists in the air lines 24, 24', the valves 22 and 23 remain in their normal position whereby the interior of the vessel communicates with the atmosphere through the normally-open blow down line and the steam line remains closed. The air lines 24, 24' are branches of the line 25 which connects with a slide valve 26 disposed on top of the diaphragm-operated lock 14. A detail description of the slide valve will be given below with specific reference to Figure 7. Suffice to say for the present that the slide valve 26 has a piston that is mechanically connected to the locking pin 18 such that when the locking pin is in its normal, down position the slide valve is open permitting the passage of air from the line 27 to the line 25 and thence to the valves 22, 23. Air pressure applied to the steam valve 22 opens such valve permitting steam to enter the chamber whereas air pressure applied to the blow down valve closes such valve. When, however, the locking pin 18, of the diaphragm-operated lock, is not in its maximum downward position the slide valve 26 keeps the line 27 closed and the air line 25 remains connected to the atmosphere whereby the steam valve 22 remains closed and the blow down valve 23 remains open. It will be clear, therefore, that the automatic control of the steam inlet and blow down valves, in relation to the position of the locking pin, provides a valuable safety feature. Unless the door of the vessel is properly closed to permit the locking pin to drop into the door bore the vessel cannot be pressurized.

The air line 27 is connected to the main air supply line 16 through a three-way, diaphragm-operated valve 30, the control air line 31, of this valve, being connected to the main air supply line 16 back of the three way, hand-operated valve 32.

A complete operating cycle of the apparatus will now be described. To start the operations, the operator turns the three-way hand valve 32 to the position shown in Figure 4. This cuts off the main air line 16 and permits air to escape from the lines 31 and 33, through the line 34, to the atmosphere. The low, initial pressure in the vessel 10 results in an opening of the control valve associated with the sensing unit 13, but the absence of air pressure in the line 33 renders the opening of such valve ineffective with respect to the operation of the diaphragm-operated lock 14. If the door 11 of the vessel is not properly and completely closed the locking pin 18 will retain the associated slide valve 26 closed to the air line 27 whereby the steam valve 22 remains closed and the blow down valve 23 remains open. If, however, the door of the vessel is properly closed, the locking pin 18 is forced to its lowermost position by the coiled spring 19 thereby opening the slide valve 26 to the line 27. Since the air line 31 is at atmospheric pressure the plunger 35, of the diaphragm-operated valve 30, is in the down position (as shown in Figure 4), thereby closing off the exhaust port and permitting the air from the supply line 16 to enter into the line 27. This air pressure is effective to open the steam valve 22 and close the blow down valve 23 since the slide valve 26 is now open. The material within the vessel is subjected to the appropriate steam pressure-time cycle and upon the completion of such cycle the operator turns the hand valve 32 to the position shown in Figure 5, in which position the exhaust port is closed and air from the supply line 16 enters into the line 34 that feeds the lines 31 and 33. Air pressure in the line 31 moves the plunger 35, of the diaphragm-operated valve 30, to its upper position, (as shown in Figure 5) whereby the main air supply line is closed off and air in the line 27 escapes to the atmosphere. Since the locking pin 18, of the diaphragm-operated lock 14 is in its proper lowermost position, the slide valve 26 is open, thereby permitting air from the line 25, and lines 24, 24', to escape through the exhaust port of the valve 30, whereupon the steam valve 22 closes and the blow down valve 23 opens. During all this time the pressure-responsive sensing element 13 retains the associated control valve in the closed position. Consequently, the air pressure in the line 33 is not transmitted to the line 36 that connects to the diaphragm-operated lock 14. The locking pin 18, therefore, remains in the down position to prevent opening of the door 11. When the pressure within the vessel is reduced to a safe value, the sensing element opens the control valve and the resulting air pressure in the line 36 overcomes the bias of the coiled spring 19 to move the locking pin out of the bore in the door whereupon the door can be opened safely.

Reference is now made to Figure 6 which is a vertical, central sectional view of the sensing element and the associated control valve. A diaphragm 40 is secured peripherally between the flanges 41, 42 which are fastened together by the bolts 43 and cooperating nuts 44. The lower flange 42 includes a threaded hole to accommodate the pipe P which supports the entire element from the vessel (see Figure 4). It will be apparent, therefore, that the chamber 46, formed between the diaphragm 40 and the inner wall of the lower flange 42, is in direct communication with the interior of the vessel. The bushing 48, secured to the center of the diaphragm 40, by the screw 49 and washer 50, includes a bore that serves as a bearing for the shaft 51, the other end of the shaft being journaled in a bearing 52 that is threaded in the bushing 53 secured to a pivoted lever arm 54. As is apparent from the drawing, the bearing 52 may be adjusted so that a predetermined amount of flexing of the diaphragm 40 will impart a predetermined amount of rotational movement of the lever arm 54 about the pivot pin 55, said pivot pin being carried by a vertical support 45 secured to the disc 56 by the screw 57. It may here be pointed out that the disc 56 is secured rigidly to the upper flange 41 by screws which do not show in the sectional view of the drawing. The described adjustment of the upper bearing 52 affords a means for establishing the on-off operation of the associated control valve in response to a predetermined pressure effective upon the diaphragm 40, as will become more apparent below, and the bearing 52 is retained in the desired position by the lock nut 59. It will be noted that the lever arm 54 is biased in a clockwise direction by the helical spring 60, one end of the spring being attached to a terminal 61 that is secured to the disc 56 and the other spring end being attached to a threaded stud 62 carrying the lock nuts 63. Thus, the shaft 51 normally is biased in a downward direction by a force determined by the adjustment of the spring 60 and the compliance of the diaphragm 40. When, however, the pressure in the chamber 46 exceeds a predetermined value the diaphragm is forced upwardly thereby imparting a counter-clockwise rotation to the lever arm 54. Excess pressure developed in the chamber 46 merely brings the head of the stud 48 into contact with the shoulder formed in the upper flange 41 and causes the diaphragm to flex into contact with the adjacent surface of the upper flange, thereby preventing damage to the diaphragm. In actual practice the flexing movement of the diaphragm is only a few thousandths of an inch and the device is designed to withstand operating steam pressures exceeding 150 pounds per square inch.

Rotational movement of the lever arm 54 controls the opening and closing of the associated air-control valve carried by the support 65 forming an integral part of the disc 56. Such valve comprises a body 70 having an outlet port 71 connected to the air line 36 and an inlet port 72 connected to the air line 33. It may here be pointed out that the relative positions of the air lines 33, 36 are reversed in the diagrammatic representation of Figure 4 for purposes of clarity. Reverting again to Figure 6, the body of the valve includes two vertical, alined bores terminating in a reduced-diameter passageway midway between the ports 71, 72. The lower bore is closed by a threaded cap 74. The cap 74 includes four, integral, spaced fingers 75 which have their free ends bent inwardly to contain the steel ball 77 which rests upon a coiled spring 78. Such spring normally biases the ball against the inwardly bent ends of the fingers 75 so that the ball closes off the restricted passageway when the cap 74 is threaded into position. The upper bore is closed by the two threaded caps 79, 80 having alined holes extending therethrough to receive the plunger 81, said plunger having an enlarged-diameter stop 82 intermediate of the ends. An end of the plunger abuts against the lower surface of the lever arm 54 and the other end extends loosely through the restricted passageway and into contact with the ball 77. The apparatus is so adjusted that when the pressure in the chamber 46 exceeds 10 inches of water the diaphragm 48 is bowed upwardly whereby the lever arm 54 is rotated in a counter-clockwise direction and the spring 78 presses the steel ball 77 upwardly thereby closing off the air passageway at this point. Under this condition the stop 82, of the plunger 81, is spaced from the bottom of the cap 79 whereby air in the outlet line 36 passes through the port 71, through the clearance area between the plunger 81 and the hole in the cap 79, and through the vent 76 in the cap 80 to the atmosphere. When, however, the pressure in the chamber 46 is below 10 inches of water, the diaphragm 40 is bowed downwardly under the force of the coiled spring 60 effective through the lever arm 54 and the shaft 51. Under this condition the lever arm 54 moves in a clockwise direction causing the plunger 81 to move the ball 77 downwardly, against the normal restraining force of the spring 78, thereby opening the air passageway at this point. The plunger moves downwardly until the stop 82 closes off the hole in the cap 79. Air now flows from the inlet line 33 through the port 72 through the space between the fingers 75, through the restricted passageway and out of the port 71 to the outlet line 36. The external parts of the sensing element are protected by the cover 15 secured in position by a screw 83 threaded into the vertical post 84. As explained with reference to Figure 4, the opening and closing of the control valve of the sensing element controls the position of the locking pin 18 of the diaphragm-operated lock 14.

Reference is now made to Figure 7 for a description of the diaphragm-operated lock and slide valve, Figure 7 being essentially a vertical, central sectional view with certain parts shown in elevation. The device comprises a plurality of the vertically-disposed frame members 90 joined by a horizontal spider 91. Upper and lower domed-shaped flanges 92, 93, respectively, are secured to the upper frame members 90 by suitable bolts 94 passing through alined holes and threaded into the bushings 95, the latter having reduced-diameter, threaded, lower ends passing through suitable holes in the frame members and carrying the bolts 96. The diaphragm 97 is clamped peripherally between the two flanges, such clamping arrangement including the bolts 98 and nuts 99 disposed in the regions between the frame members 90. A shaft 100 is secured to the diaphragm by the threaded nuts 101 and 102, said diaphragm being clamped between the floating saucer 103 and the shoulder on the nut 102 as shown. It is clear, therefore, that the shaft 100 will move up and down in accordance with a corresponding movement of the diaphragm in response to air pressure within the chamber 104. The air pressure within the chamber 104 is controlled by the air line 36 (see also Figures 4 and 6) that is connected to the lower flange by the coupling 105. The central, unthreaded portion of the shaft 100 extends through the gland nut 106, that is threaded into an appropriate hole in the flange 93, and a clearance hole in the cap nut 107. As shown in the drawing the cap nut is threaded on to the lower end of the gland nut causing the bushing 108 to compress the packing material 109 about the shaft 100 and thereby sealing off the pressure chamber 104.

The lower end of the shaft 100 is threaded into a larger diameter rod 110 which, in turn, is threaded into the upper end of the locking pin 18, the pin 18 and rod 110 being secured against relative displacement by the lock nut 111. It will be noted that the rod 110 is provided with a shoulder which supports the disc 112, the latter being secured to the rod by the lock washer 113 and nut 114. The relatively heavy spring 19, disposed between the disc 112 and the lower surface of the flange 93, normally biases the disc 112 downwardly to rest upon the spider 91. However, when the air pressure in the chamber 104 is sufficient to overcome the biasing action of the spring 19, the diaphragm 97 will flex upwardly resulting in an upward movement of the shaft 100 and the locking pin 18. The parts are so designed that the upward movement of the locking pin is sufficient to withdraw the pin end from the bore in the door of the vessel, as has been described with reference to Figures 1 to 3.

The slide valve 26 (see Figure 4), which controls the operation of the steam inlet and outlet valves of the vessel, will now be described. Such valve comprises a body 120 including a flange bottom 122 that is secured to the flange 92 by the screws 121. A piston 123 is secured to the stem 124 which passes through a clearance hole in the flange 92 and has its lower end secured to the shaft 100 as by a lock screw 125. An upper retaining cap 126 is threaded into the valve body, said cap having a bore 127 to receive the piston and a radial hole 128 alined with the valve inlet port 129. A lower, hollow retaining cap 130 is also threaded into the valve body said cap also being adapted to receive the piston and including a radial hole alined with the bleed hole 131. As shown in the drawing, the piston 123 operates within the resilient O ring washers 133 and the valve body includes the outlet port 134. When the piston 123 is at its lowest limit of travel the valve is open, that is, air passes from the inlet port 129, through the radial hole 128 and bore 127 in the upper retaining cap, and out of the outlet port 134.

When the piston 123 is at its uppermost limit of travel the valve is closed, that is, air cannot pass between the upper O ring and the piston but the air in the outlet line can escape to the atmosphere through the bleed hole 131. Movement of the piston between its upper and lower limits of travel is controlled by the diaphragm 97. It will now be clear that when the locking pin 18 of the diaphragm-operated lock 14 (see Figure 4) is seated within the bore in the door of the vessel, the slide valve 26 is open and the vessel can be pressurized. If, however, the locking pin is in the raised position, as when the door is not properly closed and locked, the slide valve 26 remains closed whereby the steam inlet valve to the vessel remains closed and the vessel cannot be pressurized. Further, after the processing cycle has been completed the locking pin 18 remains in the door-locking (or down) position until the control valve of the sensing element opens to pass air to the diaphragm-operated lock, such air pressure withdrawing the locking pin from the bore in the door.

Figure 8 is a diagrammatic representation similar to Figure 4 but showing my safety system incorporated in an automatically controlled processing arrangement. Whereas in the Figure 4 arrangement the air line 24 (controlling operation of the steam valve 22) and the air line 24' (controlling operation of the blow down valve 23) were connected directly to the slide valve 26, such air lines are now connected to the slide valve through the process controller 140. Such process controllers are well known in the art and include a timing mechanism which can be preset to provide the time-temperature cycle required by the particular processing operation. In the present case, the start of the processing cycle is controlled by a manually-operated, four way, push-pull valve 141. It may here be pointed out that such manual action required to start the operations is highly desirable in order to prevent accidental opening of the vessel, steam-inlet valve when the door is open. As shown in Figure 8, the piston of the hand valve 141 is in the "start" position whereby air under pressure passes from the supply line 16 to the line 142 that is connected to the inlet port of the slide valve 26. If the vessel door is not properly closed the locking pin 18 will be in the raised position and the slide valve will be closed. If, however, the door is properly closed, the locking pin will drop into the bore in the door under the action of the coiled spring 19 thereby opening the slide valve 26 whereby air passes through the line 143 to the process controller. It should be noted that when the piston of the hand valve 141 is in the illustrated position the air in the lines 36 and 144 escapes to the atmosphere through the vent-port 145 in the hand valve, the control valve associated with the sensing element 13 being open by reason of the low pressure in the vessel at the start of the processing cycle. Consequently, the locking pin 18 is biased downwardly into the door bore. The processing controller is so arranged that the air pressure in the line 143 is transmitted through the lines 24 and 24' thereby opening the steam valve 22 and closing the blow down valve 23. After the processing cycle has been completed the controller 140 automatically closes off the air lines 24 and 24' to return the steam valve 22 and the blow down valve 23 to their original and normal positions. A suitable audible or visual alarm may be set into operation by the controller 140 to call the operator's attention to the fact that the processing cycle has been completed. Thereafter, in order to open the door of the vessel the operator must pull the piston of the hand valve 141 outwardly. Those skilled in this art will understand that when the piston of the hand valve is moved outwardly a short distance the air in the lines 142 and 143 will vent to the atmosphere through the vent-port 146 and, at the same time air will pass from the supply line 16 to the line 144 that is connected to the inlet port of the control valve associated with the sensing element. However, such control valve remains closed until the pressure within the vessel is reduced to a predetermined, safe value for which the sensing element has been set. When the internal vessel pressure is reduced to such value the control valve opens to pass air through the line 36 to thereby raise the locking pin and permit opening of the door.

While I have illustrated and described several embodiments of my safety arrangement wherein the sensing element responds to the pressure within the vessel, the invention is not limited to such specific application. In the case of a vessel utilized in a process wherein the vessel is partially, or completely, filled with a liquid, the sensing element can be secured to the bottom of the vessel in an inverted position whereby the diaphragm will respond to hydrostatic pressure. In such case, the diaphragm and associated mechanism may be adjusted to retain the air-control valve in the closed position until the liquid head is of a predetermined low order whereby the vessel door may be opened safely. Further, those skilled in this art will find no difficulty in adapting my novel safety arrangement for response to the liquid level within a vessel, as distinguished from the pressure-responsive arrangements herein described. In an arrangement responsive to liquid level the diaphragm of my sensing element may be actuated by a suitable, pivotally-mounted float. The point here being stressed is that my novel safety arrangement is designed to prevent the accidental start of a processing operation unless the door of the vessel is properly closed and locked and to prevent the opening of the door until the conditions within the vessel have been established at a predetermined safe norm.

Having now described my invention in detail in accordance with the Patent Statutes what I desire to protect by Letters Patent of the United States is set forth in the appended claims.

I claim:

1. In a safety arrangement for a pressure vessel having a door and air-operated steam inlet and blow down valves, the improvement comprising a locking pin supported by a frame member secured to the vessel said locking pin extending through an opening in the vessel, spring means normally biasing the locking pin so that an end thereof extends into a bore formed in the peripheral surface of the door when the latter is in the closed position, a pressure-actuated diaphragm member carried by the said frame member and mechanically coupled to the locking pin said diaphragm member being responsive to air pressure to withdraw the locking pin from the door bore, a slide valve carried by the frame and having a piston mechanically coupled to the locking pin said slide valve being open when the locking pin extends into the door bore and closed when the locking pin is withdrawn from the door bore, and an air line connecting the steam inlet and blow down valves to a source of air pressure through the said slide valve.

2. In a safety arrangement for a pressure vessel having a door and air-operated steam inlet and blow down valves, the improvement comprising a locking pin supported by a frame member secured to the vessel said locking pin extending through an opening in the vessel, spring means normally biasing the locking pin so that an end thereof extends into a bore formed in the peripheral surface of the door when the latter is in the closed position, a pressure-actuated diaphragm member carried by the frame member and mechanically coupled to the locking pin said diaphragm member being responsive to air pressure to withdraw the locking pin from the door bore, a slide valve carried by the frame member and having a piston mechanically coupled to the locking pin said slide valve being open when the locking pin extends into the door bore and closed when the locking pin is withdrawn from the door bore, a first air line connecting the steam inlet and blow down valves to a source of air pressure through the said slide valve, a pressure-sensitive element communicating with the interior of the vessel and including a diaphragm movable in response to changes in the pressure within the vessel, a control valve actuated to open and closed positions by the diaphragm of the pressure-sensitive element, and a second air line connecting the said pressure-actuated diaphragm member to the source of air pressure through the said control valve.

3. The invention as recited in claim 2, wherein the pressure-sensitive element is disposed within a housing secured to the vessel and provided with an aperture, the said diaphragm is spaced from the aperture to form a pressure chamber communicating with the interior of the vessel, the said control valve includes a piston extending outwardly of the valve body, a pivoted lever, spring means biasing the lever into contact with the extended end of the piston, and means mechanically coupling the said diaphragm to the pivoted lever.

4. The invention as recited in claim 3, wherein the means mechanically coupling the said diaphragm to the pivoted lever comprises a bushing secured to the center of the diaphragm said bushing having an axial bore, a hollow bushing secured to the pivoted lever, a bearing member adjustably secured within the hollow bushing, and a shaft having one end disposed within the bore of the bushing secured to the diaphragm and the other end journaled within the bearing member.

5. The invention as recited in claim 2, including a hand-operable, three-way valve interposed in the air line between the source of air pressure and the said control valve.

6. The invention as recited in claim 4, including a three-way, diaphragm-operated valve, said three-way valve being connected into the air line between the source of air pressure and the said slide valve, and the diaphragm of said three-way valve being actuated by the air pressure in the air line between the said hand-operable valve and the said control valve.

7. A safety arrangement for a pressure vessel having air-operated steam inlet and blow down valves and a door provided with a bore that is alined with an opening in the vessel when the door is in the closed position, said arrangement comprising a locking pin extending through the opening in the vessel, spring means normally biasing the locking pin so that an end thereof enters the door bore when the door is in the closed position, a pressure-actuated diaphragm mechanically coupled to the locking pin and responsive to air pressure to withdraw the end of the locking pin from the door bore, a slide valve having a piston mechanically coupled to the locking pin said slide valve being open when the end of the locking pin is disposed within the door bore, a first air line connected between the slide valve and the vessel steam inlet and blow down valves, a pressure-sensitive element communicating with the interior of the vessel and including a diaphragm movable in response to pressure changes within the vessel, a control valve operable to open and closed positions by the diaphragm of the pressure-sensitive element, a second air line connecting the control valve to the pressure-actuated diaphragm associated with the locking pin, a third air line connecting the said slide valve to a normally-open diaphragm-operated valve, a fourth air line connecting the said control valve to the diaphragm port of the diaphragm-operated valve, a main air supply line leading from the diaphragm operated valve and adapted to be connected to a source of air pressure, and a three-way hand valve connected between the said fourth air line and the said main air supply line.

8. The invention as recited in claim 7, wherein the door is of the breech-lock type and the vessel includes a door-supporting frame formed in a manner so that portions of the frame define an opening through which the said locking pin extends.

9. A diaphragm-operated door-locking device for pressure vessels said device comprising a frame consisting of a plurality of rigid diverging members connected by an integral, lateral spider member positioned intermediate of the end of the said members, means for securing the frame to the vessel, upper and lower dome-shaped members carried by the ends of the said rigid members and forming a chamber, a pressure-deformable diaphragm peripherally secured by the dome-shaped members to form an air pressure chamber between the diaphragm and the lower dome-shaped member, means forming an air passageway between the said air pressure chamber and the atmosphere, a shaft secured to the center of the diaphragm and extending through an opening formed in the lower dome-shaped member, means forming a pressure seal between said shaft and the said opening in the lower dome-shaped member, a door-locking pin axially secured to the shaft and extending outwardly of said frame, a disc secured to the said shaft, a coiled spring disposed between the disc and the lower dome-shaped member and normally biasing the said disc into contact with the spider member, a valve body secured to the upper dome-shaped member said body being formed to provide air inlet and outlet ports communicating with a central bore and the atmosphere, and a piston movable in said central bore and secured to the said shaft.

References Cited in the file of this patent

UNITED STATES PATENTS

| | | |
|---|---|---|
| 913,700 | Cornman | Mar. 2, 1909 |
| 1,503,971 | Bost | Aug. 5, 1924 |
| 1,545,990 | Weeks | July 14, 1925 |
| 1,555,174 | Williams | Sept. 29, 1925 |
| 2,189,653 | Luthe | Feb. 6, 1940 |
| 2,358,344 | Meyer | Sept. 19, 1944 |
| 2,593,046 | McKee | Apr. 15, 1952 |

FOREIGN PATENTS

| | | |
|---|---|---|
| 19,959 | Great Britain | Mar. 18, 1915 |